(12) United States Patent
Tsai et al.

(10) Patent No.: US 10,535,157 B2
(45) Date of Patent: Jan. 14, 2020

(54) POSITIONING AND MEASURING SYSTEM BASED ON IMAGE SCALE

(71) Applicant: National Tsing Hua University, Hsinchu (TW)

(72) Inventors: Hung-Yin Tsai, Hsinchu (TW); Wei-Cheng Pan, New Taipei (TW); Yu-Chen Wu, Kaohsiung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 154 days.

(21) Appl. No.: 15/821,221

(22) Filed: Nov. 22, 2017

(65) Prior Publication Data

US 2019/0080468 A1    Mar. 14, 2019

(30) Foreign Application Priority Data

Sep. 13, 2017   (TW) .............................. 106131356 A

(51) Int. Cl.
*G06K 9/62* (2006.01)
*G06T 7/73* (2017.01)
(Continued)

(52) U.S. Cl.
CPC .............. *G06T 7/73* (2017.01); *G06F 3/0317* (2013.01); *G06K 9/32* (2013.01); *G06K 9/6202* (2013.01);
(Continued)

(58) Field of Classification Search
CPC ............. G06T 7/73; G06T 2207/30208; G06T 2207/10004; G06T 7/60; G06F 3/0317;
(Continued)

(56) References Cited

U.S. PATENT DOCUMENTS

2004/0089719 A1* 5/2004 Blattner .................. G06K 7/14
235/454
2005/0286922 A1* 12/2005 Oki ...................... H04N 1/0058
399/75
(Continued)

FOREIGN PATENT DOCUMENTS

JP         H02157614 A    6/1990
JP         11248489    *   9/1999   ............... G01D 5/30
(Continued)

*Primary Examiner* — Jerome Grant, II
(74) *Attorney, Agent, or Firm* — Muncy, Geissler, Olds & Lowe, P.C.

(57) ABSTRACT

A positioning and measuring system includes: an image scale supporting an object and having positioning mark sets and encoding pattern sets arranged in a two-dimensional array, each of the positioning mark sets including positioning marks, each of the encoding pattern sets including encoding patterns respectively disposed in gaps between the positioning marks; an image capturing device capturing measurement points of the object and an image scale to obtain composite images; a processor processing the composite images and determining one or multiple position relationships between the measurement points according to the encoding patterns and the positioning marks; and a driving mechanism, which is electrically connected to the processor and mechanically connected to the image capturing device or the image scale, and drives one of the image capturing device and the image scale to move relatively to the other of the image capturing device and the image scale.

12 Claims, 7 Drawing Sheets

(51) Int. Cl.
  *G06K 9/32* (2006.01)
  *G06F 3/03* (2006.01)
(52) U.S. Cl.
  CPC ........... *G06K 9/627* (2013.01); *G06K 9/6215* (2013.01); *G06K 2009/3225* (2013.01); *G06T 2207/30208* (2013.01)
(58) Field of Classification Search
  CPC ........ G06K 9/32; G06K 9/6215; G06K 9/627; G06K 9/6202; G06K 2009/3225
  USPC ......................................................... 382/103
  See application file for complete search history.

(56) References Cited

U.S. PATENT DOCUMENTS

| | | | | |
|---|---|---|---|---|
| 2012/0278670 | A1* | 11/2012 | Shimamoto | G06K 7/1473 714/704e |
| 2014/0340526 | A1* | 11/2014 | Miura | H04N 17/002 348/175 |
| 2015/0037713 | A1* | 2/2015 | Nakagawa | G03F 7/0002 430/5 |
| 2017/0061596 | A1* | 3/2017 | Han | G03F 1/84 |
| 2017/0206433 | A1* | 7/2017 | Ogawa | G06T 7/74 |
| 2019/0080468 | A1* | 3/2019 | Tsai | G06T 7/73 |
| 2019/0086822 | A1* | 3/2019 | Arahara | G03F 7/70891 |
| 2019/0096631 | A1* | 3/2019 | Takekoshi | H01J 37/268 |
| 2019/0113741 | A1* | 4/2019 | Kito | G02B 26/10 |

FOREIGN PATENT DOCUMENTS

| | | |
|---|---|---|
| JP | 2000131064 A | 5/2000 |
| JP | 2007108093 A | 4/2007 |
| TW | 355212 B | 4/1999 |
| TW | I408343 B | 9/2013 |

\* cited by examiner

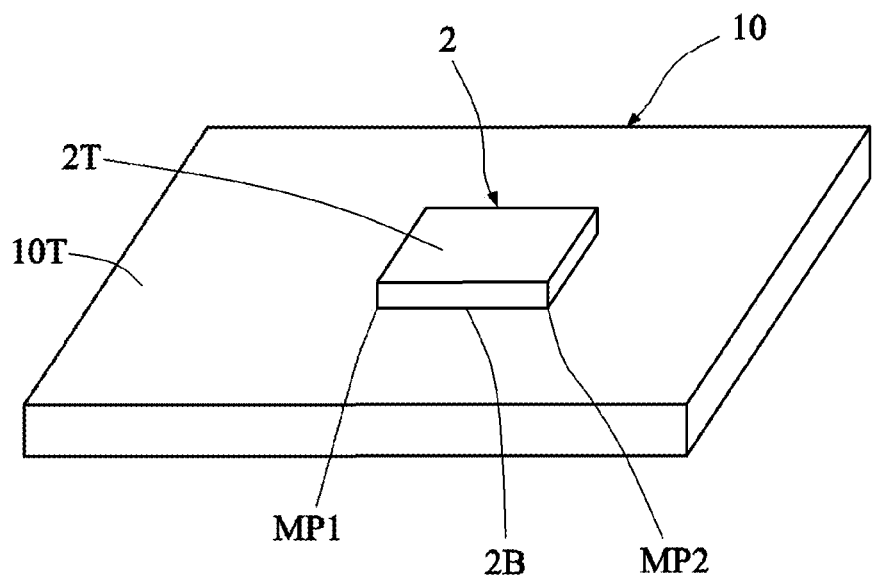
FIG. 3
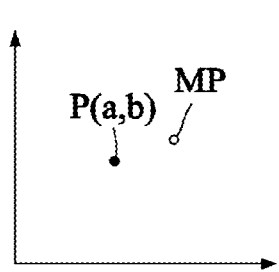 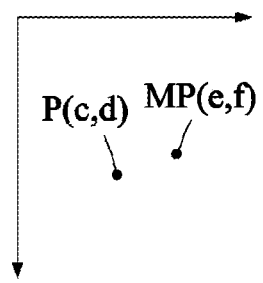 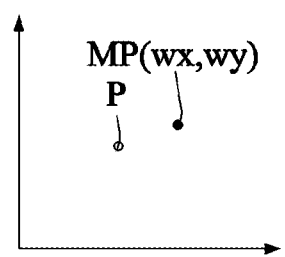
FIG. 4A　　　FIG. 4B　　　FIG. 4C

POSITIONING AND MEASURING SYSTEM BASED ON IMAGE SCALE

CROSS-REFERENCE TO RELATED APPLICATIONS

This application claims priority of No. 106131356 filed in Taiwan R.O.C. on Sep. 13, 2017 under 35 USC 119, the entire content of which is hereby incorporated by reference.

BACKGROUND OF THE INVENTION

Field of the Invention

The invention relates to a positioning and measuring system, and more particularly to a positioning and measuring system based on an image scale.

Description of the Related Art

With the development of manufacturing, the production apparatus with the flexible manufacturing function provides more flexible process design advantages to the enterprises. Recently, the flourishing development in the field of automatic optical detection makes the image recognition technology, when being applied to the process line, provide the fast and contactless analysis which can promote the production line automation and the product testing standardization, and thus decrease a lot of manufacturing costs.

The tolerance is present when a workpiece is machined and manufactured. So, the machining method, which needs to guide a tool according to a two-dimensional drawing or a three-dimensional model, encounters the problem that the workpiece dimension is inconsistent with the drawing dimension. On the other hand, the workpiece is usually mechanically fixed and positioned by jigs and fixtures. In the machining conditions of the micron-level precision requirements, however, the manufacturing tolerance of the ordinary jig and fixture has far exceeded the accuracy. Thus, the positions for picking and placing the workpiece deviate from those in the predicted ideal condition. Because a deviation amount is presented between the actual coordinate position of the workpiece and the coordinate position of the software image file due to the jig and fixture, the machining precision is affected.

In order to solve the above-mentioned problems, a coordinate measuring machine may be used to measure the coordinates of the workpiece. However, the coordinate measuring machine is expensive, usually performs the off-line static detection, and is thus not suitable for the installation on the processing machine. At present, there are many machines and much software for image measurements available in the market. However, the measurement is performed on one image. In order to see the whole object in one single field of vision, the camera must have the small magnification power, which decreases the measurement accuracy. However, if the lens of the high magnification power is selected in order to increase the measurement accuracy, then only one corner of the object can be seen in the field of vision of the camera. In order to measure the object exceeding the range of the field of vision, the positioning information of the X-Y platform usually needs to be considered, so that the efficiency cannot be effectively enhanced.

SUMMARY OF THE INVENTION

It is therefore an objective of the invention to provide a positioning and measuring system based on an image scale, so that the positioning and measuring functions can be achieved using an image processing method in conjunction with positioning mark sets and encoding pattern sets of the image scale.

To achieve the above-identified object, the invention provides a positioning and measuring system. The positioning and measuring system includes: an image scale supporting an object and having positioning mark sets and encoding pattern sets arranged in a two-dimensional array, each of the positioning mark sets including positioning marks, each of the encoding pattern sets including encoding patterns respectively disposed in gaps between the positioning marks; an image capturing device capturing measurement points of the object and the image scale to obtain composite images; a processor processing the composite images and determining one or multiple position relationships between the measurement points according to the encoding patterns and the positioning marks; and a driving mechanism, which is electrically connected to the processor and mechanically connected to the image capturing device or the image scale, and drives one of the image capturing device and the image scale to move relatively to the other of the image capturing device and the image scale.

According to the above-mentioned aspect of the invention, the to-be-measured object is placed on a carrier having the positioning marks and the encoding patterns. When the camera captures the images of the object and the patterns at the same time, the patterns are analyzed to recognize the actual position of the partial appearance of the object in the image. Consequently, as long as the captured object is placed on the image scale, the measured object is no longer limited by the size of the field of vision of the camera, and can also perform the length measurement without relying on the positioning precision of the platform.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a pictorial view showing an object and the image scale.

FIGS. 4A to 4C are schematic views respectively showing an image scale coordinate system, a pixel coordinate system and a world coordinate system.

DETAILED DESCRIPTION OF THE INVENTION

The invention provides a high-accuracy dimension measurement platform working in conjunction with an image positioning and decoding system, and is characterized in that the dimension of a workpiece is measured in an optical and contactless manner. The image processing technology is adopted to position the target object. The target object has positioning marks (or patterns) and encoding patterns (or symbols). The form of the image scale is not particularly restricted as long as an image capturing device, such as a camera, can clearly capture the patterns or symbols on the image scale.

First, an image scale is placed under the to-be-measured object. With the aid of the image scale, the measurement scale of the system breaks through the restriction of the narrow field of vision in the condition of reaching the micron-level resolution, and can measure the object having the geometric dimension that is several tens of times larger than the range of the field of vision. The patterns on the top surface of the image scale can function as the positioning source of the system, so that the image measurement system needs not to rely on the positioning precision of the moving platform.

Figure 1:
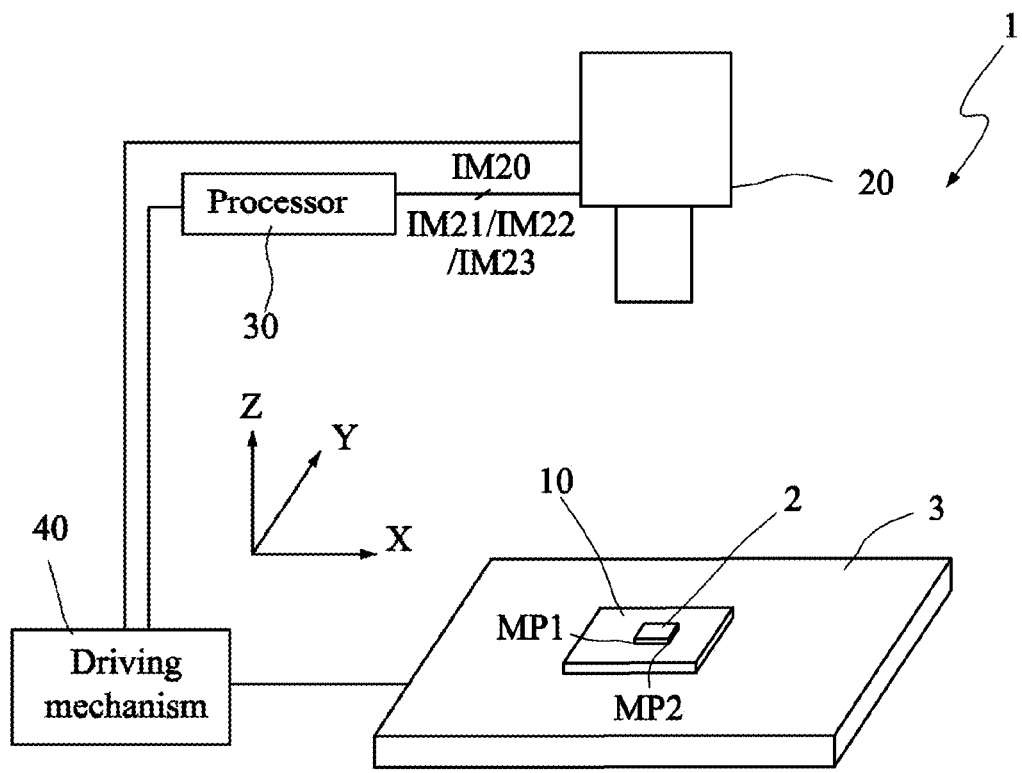
FIG. 1 is a schematic view showing a positioning and measuring system according to a preferred embodiment of the invention.
Figure 2:
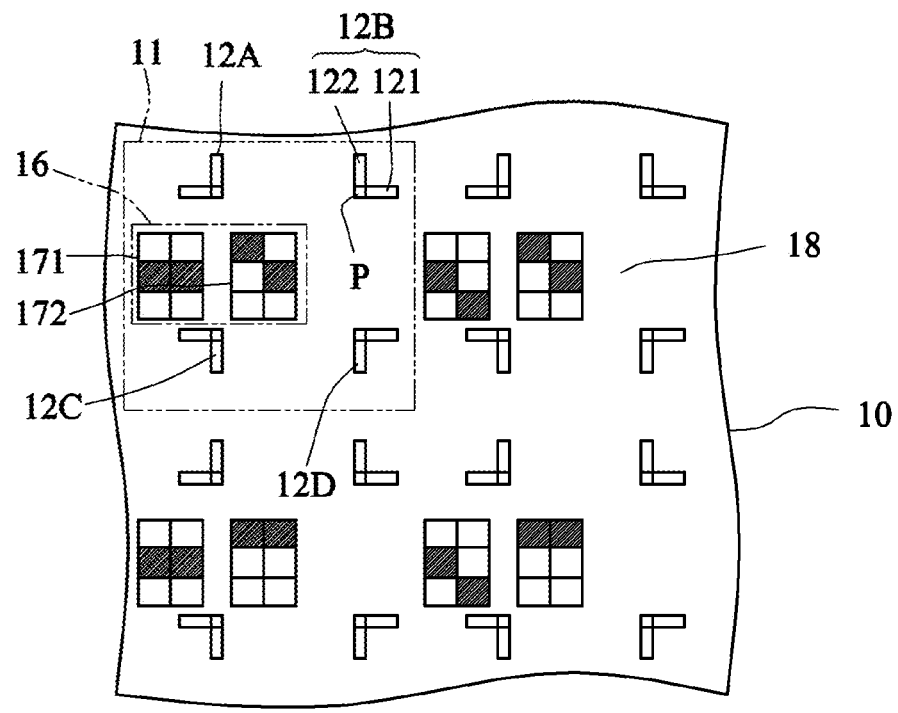
FIG. 2 is a partial enlarged schematic view showing the image scale of FIG. 1.

FIG. 1 is a schematic view showing a positioning and measuring system according to a preferred embodiment of the invention. FIG. 2 is a partial enlarged schematic view showing the image scale of FIG. 1. FIG. 3 is a pictorial view showing an object and the image scale. Referring to FIGS. 1 to 3, a positioning and measuring system 1 of this embodiment includes an image scale 10, an image capturing device 20, a processor 30 and a driving mechanism 40, wherein X, Y and Z coordinate axes are depicted in FIG. 1.

A platform 3 supports the image scale 10. The image scale 10 supports an object 2, and has positioning mark sets 11 and encoding pattern sets 16 arranged in a two-dimensional array. Each of the positioning mark sets 11 includes positioning marks 12A to 12D, each of the encoding pattern sets 16 includes encoding patterns 171 and 172, and the encoding patterns 171 and 172 are respectively disposed in gaps 18 between the positioning marks 12A to 12D. In this embodiment, each of the positioning marks includes two line segments 121 and 122 intersecting with each other at a reference point P. The four positioning marks 12A to 12D of each of the positioning mark sets 11 have the same shape but different orientations, so that multiple types of patterns can be easily determined. For example, each of the positioning marks of each of the positioning mark sets 11 has an L shape. In another example, each of the positioning marks may have a V shape. In still another example, four positioning marks of each of the positioning mark sets 11 have different shapes. For example, the positioning marks may have different included angles each formed between two lines, and this is also beneficial to the determination of multiple types of patterns.

The image capturing device 20 captures images of measurement points MP1 and MP2 of the object 2 and the image scale 10 to obtain composite images IM20. The image capturing device 20 is, for example, a camera. Each of the measurement points may be the physical point on the object 2, such as the corner point, and may also be the virtual point, such as the intersection of two edges of the object. It is worth noting that a calibration sheet can be used to calibrate the dimension of one pixel captured by the image capturing device 20 in the specific magnification, wherein the dimension is 1.05 microns in one example.

The processor 30 performs the image processing on the composite images IM20, and determines one or multiple position relationships between the measurement points according to the encoding patterns 171 and 172 and the positioning marks 12A to 12D. The processor 30 includes, for example but without limitation to, a calculator or the central processor of an electronic device.

The driving mechanism 40 is electrically connected to the processor 30, and mechanically connected to the image capturing device 20 or the image scale 10 through the platform 3, for example, to cause the relative movement between the image capturing device 20 and the image scale 10. Of course, the image scale 10 itself may also be a platform, or the image scale is formed on the platform.

In this embodiment, the image capturing device 20 captures two composite images IM20 of each of the measurement points and the image scale 10, and the two composite images IM20 include a first composite image IM21 and a second composite image IM22, which are respectively obtained when the image capturing device 20 mainly focuses on the top surfaces 10T and 2T of the image scale 10 and the object 2. That is, upon operating, the processor 30 controls the driving mechanism 40 to move the measurement point MP1 into the field of vision of the image capturing device 20, then controls the image capturing device 20 to focus on the top surface 10T of the image scale 10 to capture the first composite image IM21, and then controls the image capturing device 20 to focus on the top surface 2T of object 2 to capture the second composite image IM22. Next, the processor 30 controls the driving mechanism 40 to move the measurement point MP2 into the field of vision of the image capturing device 20, and performs the operation similar to the above-mentioned measurement point MP1.

After the composite image or images IM20 are obtained, the processor performs the following exemplified but non-limiting processing steps. First, the object edge detection is performed. Because the edge of the object has a clear and continuous pixel intensity fault, the histograms of oriented gradients are used as the features or characteristics. Next, a mobile window is used to scan the entire image progressively, and the image characteristic information captured by the window is inputted to a pre-trained support vector machine for interpretation. The locations of the horizontal edges and vertical edges are detected and recorded. Second, the terminal point detection is performed. The horizontal edge image and the vertical edge image obtained by the object edge detection are processed by way of Hough line transform, and the intersection of the two lines is recorded to obtain the terminal points of the line segments. Third, the positioning mark detection is performed. Because the patterns on the image scale are not perfect and are slightly different from the originally designed drawing, the shadow removal and the median filter are firstly used to obtain a clean and fit image, and the geometric property of the positioning mark is again utilized to perform the detection. Fourth, decoding is performed. The relative positions between the patterns and the positioning marks used for decoding are fixed. So, when the positioning mark is detected, it is possible to perform the decoding operation by calculating the pixel value at the relative position to obtain the image scale coordinates of the positioning mark. In FIG. 2, the encoding patterns 171 and 172 represent the X and Y coordinates of the image scale coordinate system, respectively. Each encoding pattern is represented by six rectangles or blocks, and the color of each rectangle or block is either fully black or fully white. For example, the encoding patterns having one black block and five white blocks correspond to the numbers 1 to 6, the encoding patterns having two black blocks and four white blocks correspond to the numbers 7 to 21, the encoding patterns having three black blocks and three white blocks correspond to the numbers 22 to 41, the encoding patterns having four black blocks and two white blocks correspond to the numbers 42 to 56, and the encoding patterns having one black block and five white blocks correspond to the numbers 57 to 62. So, the encoding patterns correspond to 62 ($2^6-2=62$) numbers in total, wherein the encoding patterns having six black blocks and six white blocks are not used to prevent the misjudgement.

FIGS. 4A to 4C are schematic views respectively showing an image scale coordinate system, a pixel coordinate system and a world coordinate system. As shown in FIGS. 4A to 4C, an X-axis direction of an image scale coordinate system for specifying the image scale coordinates is the same as X-axis directions of a measurement pixel coordinate system for specifying the measurement pixel coordinates, a reference pixel coordinate system for specifying the reference pixel coordinates, and a world coordinate system for specifying the world coordinates, and a Y-axis direction of the image scale coordinate system is the same as a Y-axis direction of the world coordinate system, and is opposite to the Y-axis direction of the measurement pixel coordinate system and the reference pixel coordinate system. The image scale coordinates (x, y) in FIG. 4A are equivalent to the world coordinates (x*1000, y*1000) in FIG. 4C. The pixel coordinate system in the image of FIG. 4B must be linked with the world coordinate system by the center position of the positioning mark "L". For example, if the image scale coordinates of the center position of "L" are (10, 10), and the pixel coordinates of the center position of "L" of the image are (750, 250), then the world coordinates of the center position of "L" are (10,000, 10,000), and the world coordinates corresponding to the coordinates (755, 255) of the pixel in the image are (10,000+5*1.05, 10,000−5*1.05), where "1.05" is the object resolution of the lens (1.05 μm/pixel).

In order to calculate the world coordinates of the measurement points MP1 and MP2 to further determine the distance between the measurement points MP1 and MP2, the processor 30 performs the following steps on the measurement points MP1 and MP2: (i) determining the measurement pixel coordinates of the measurement point MP1 according to the second composite image IM22; (ii) determining the image scale coordinates and the reference pixel coordinates of the reference point P of the positioning mark 12A according to the positioning mark set 11 and the encoding pattern set 16 in the first composite image IM21, wherein it is assumed that the image scale coordinates are (a, b), the measurement pixel coordinates are (c, d) and the reference pixel coordinates are (e, f); and (iii) determining the world coordinates of the measurement point MP1 according to the image scale coordinates, the measurement pixel coordinates, the reference pixel coordinates, a unit length (g units) of the positioning mark set 11, a pattern of the positioning mark 12A/12B/12C/12D, and an object resolution (h units/pixel) of the image capturing device 20. The above-mentioned pattern is one of the first to fourth patterns. For example, the pattern of the positioning mark 12A/12B/12C/12D in FIG. 2 is the first/second/third/fourth patterns. In addition, the unit length g of the positioning mark set 11 represents the side length of the square formed by connecting the four P points of FIG. 2 together, that is, the positioning mark appears once every g units, or the positioning mark having the same pattern will repeatedly appear every 2g units. In the following example, g is equal to 500 microns (μm). The reference pixel coordinates and the measurement pixel coordinates belong to the pixel coordinate system, and the original thereof is the upper left corner of the shot image.

Based on the above-mentioned assumptions, when the pattern of the positioning mark is the first pattern, the world coordinates of the measurement point are (2g*a+(c−e)*h, 2g*b−(d−f)*h); when the pattern of the positioning mark is the second pattern, the world coordinates of the measurement point are (2g*a+(c−e)*h+g, 2g*b−(d−f)*h); when the pattern of the positioning mark is the third pattern, the world coordinates of the measurement point are (2g*a+(c−e)*h, 2g*b−(d−f)*h−g); and when the pattern of the positioning mark is the fourth pattern, the world coordinates of the measurement point are (2g*a+(c−e)*h+g, 2g*b−(d−f)*h−g).

Figure 5:
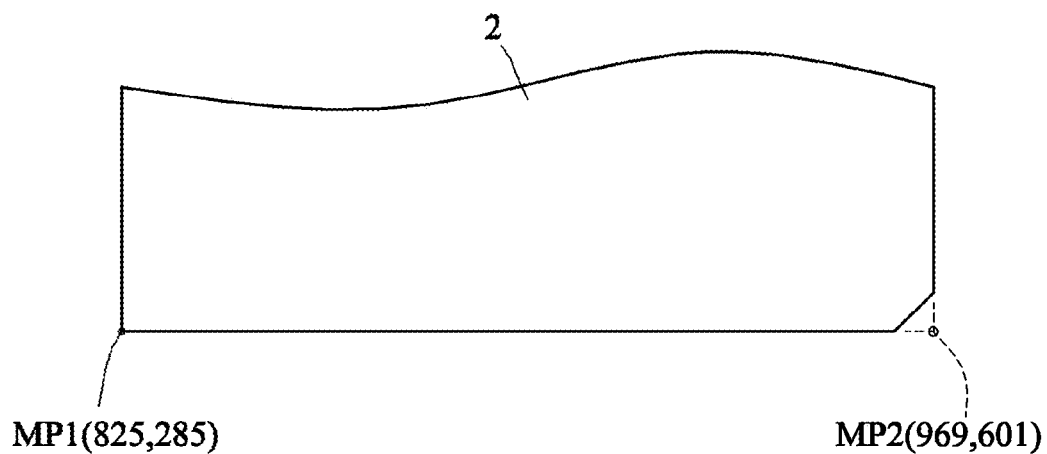
FIG. 5 is a partial top view showing the object.
Figure 6A:
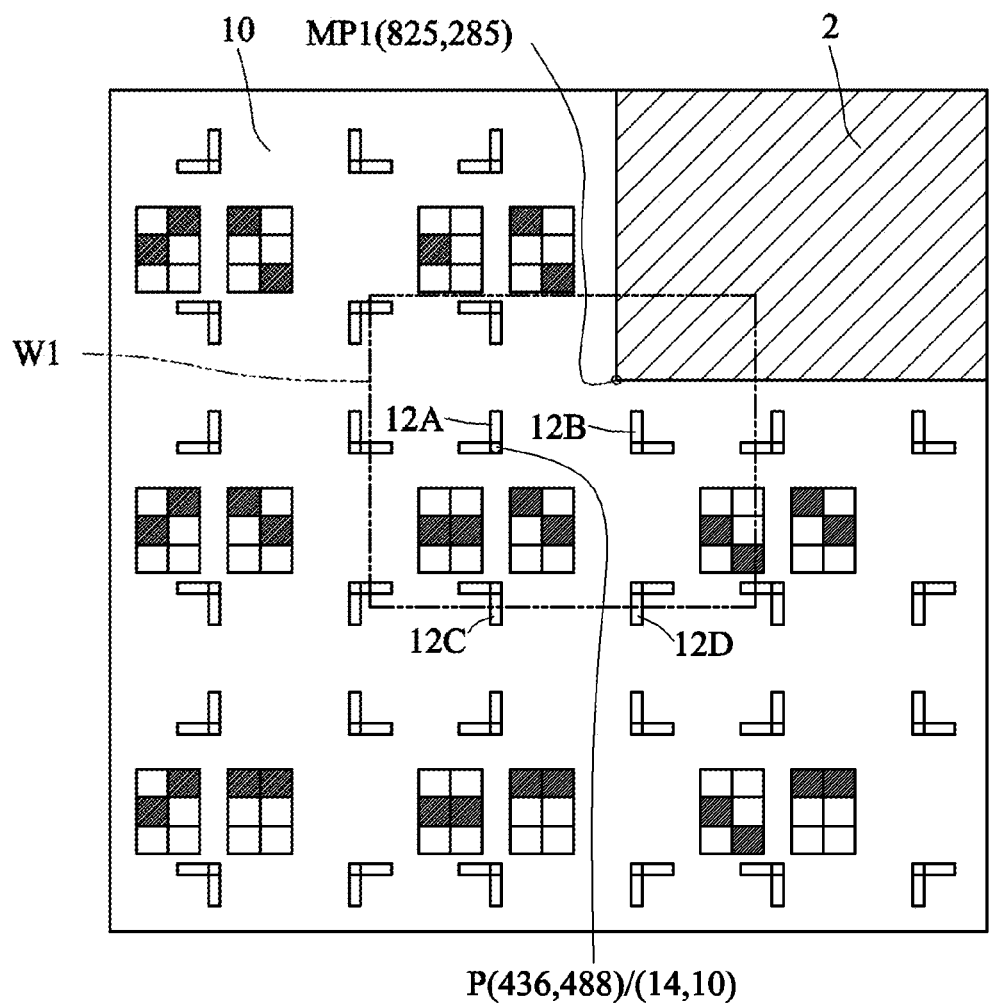
FIGS. 6A, 6B and 7 are schematic views showing photographing of the image scale and two measurement points of the object.
Figure 6B:
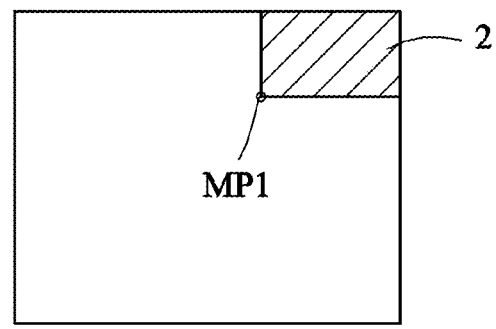
Figure 7:
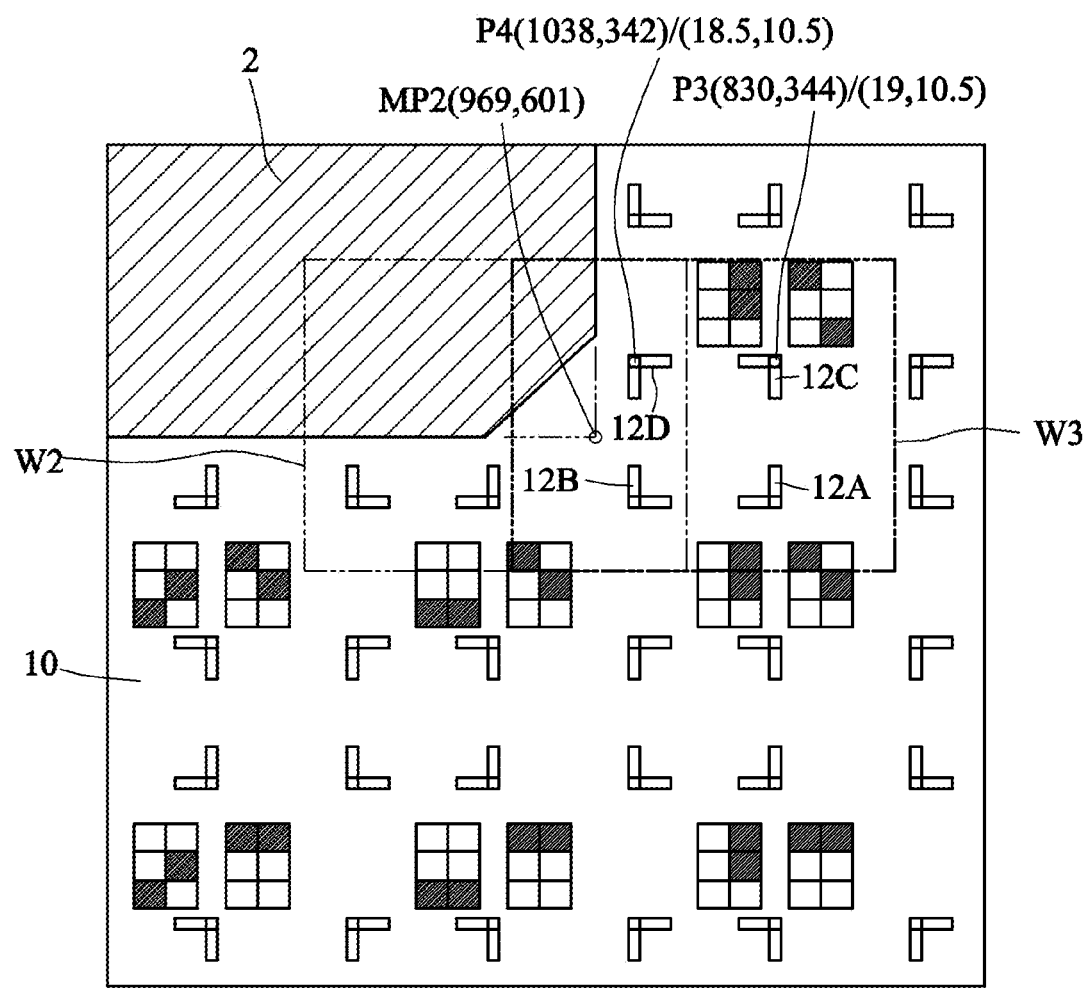

FIG. 5 is a partial top view showing the object. FIGS. 6A, 6B and 7 are schematic views showing photographing of the image scale and two measurement points of the object. As shown in FIGS. 5 to 7, the calculation of the world coordinates of the measurement points MP1 and MP2 will be described as an example. In a top view of the positioning and measuring system 1, as shown in FIGS. 3, 6A and 6B, the object 2 is smaller than and entirely falls within the image scale 10.

Figure 8A:
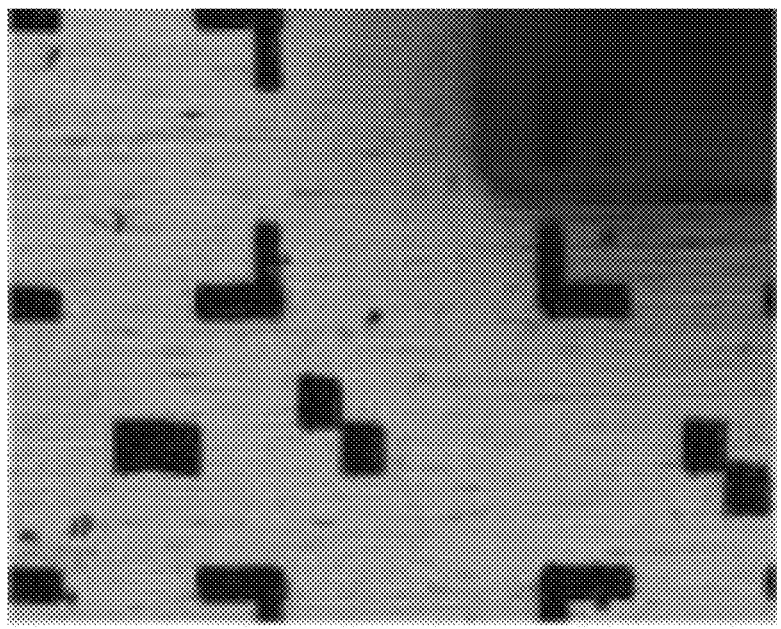
FIGS. 8A to 8E show examples of actually photographed composite images.
Figure 8B:
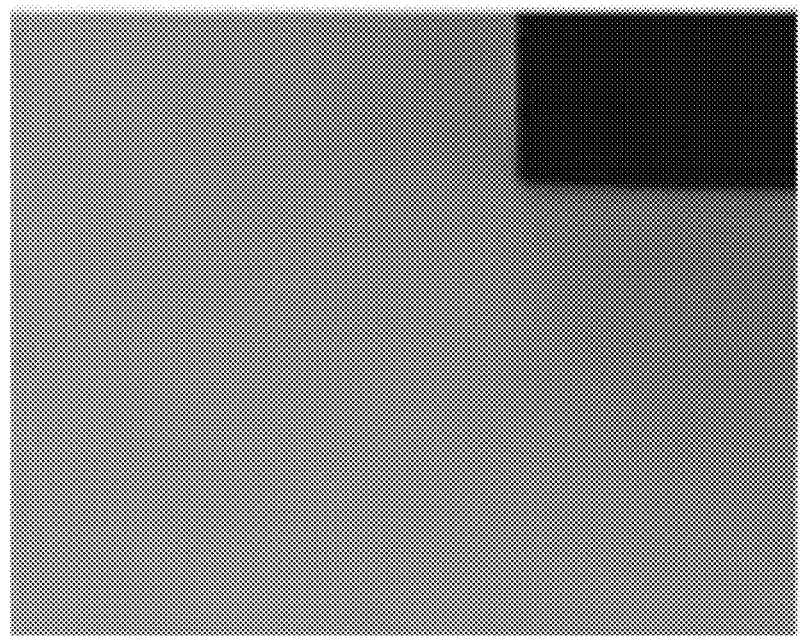

In FIG. 6A, a window W1 is the window of the first composite image IM21 and the second composite image IM22, wherein the second composite image IM22 may only have the object 2, and does not have the positioning mark and the encoding pattern, as shown in FIG. 6B, wherein the actual shooting result is shown in FIG. 8B; the first composite image IM21 may have the object 2, the positioning marks and the encoding patterns, as shown in the contents of the window W1 of FIG. 6A, and the actual photographed result is shown in FIG. 8A. In addition, it is worth noting that the white portion of the encoding pattern taken by the camera needs not to have a border. The measurement pixel coordinates (825,285) of the measurement point MP1 can be obtained according to the second composite image IM22 of FIG. 6B (focusing on the top surface of the object), and the image scale coordinates (14, 10) and the reference pixel coordinates (436, 488) of the reference point P of the first type of "L" symbol can be obtained according to the first composite image IM21 (focusing on the top surface of the image scale), wherein the encoding patterns above the positioning mark 12C in FIG. 6A represent the numbers 14 and 10, respectively. According to the above-mentioned formula, the world coordinates of the measurement point MP1 can be calculated as (1000*14+(825−436)*1.05, 1000*10−(285−488)*1.05)=(14408, 10213).

Figure 8C:
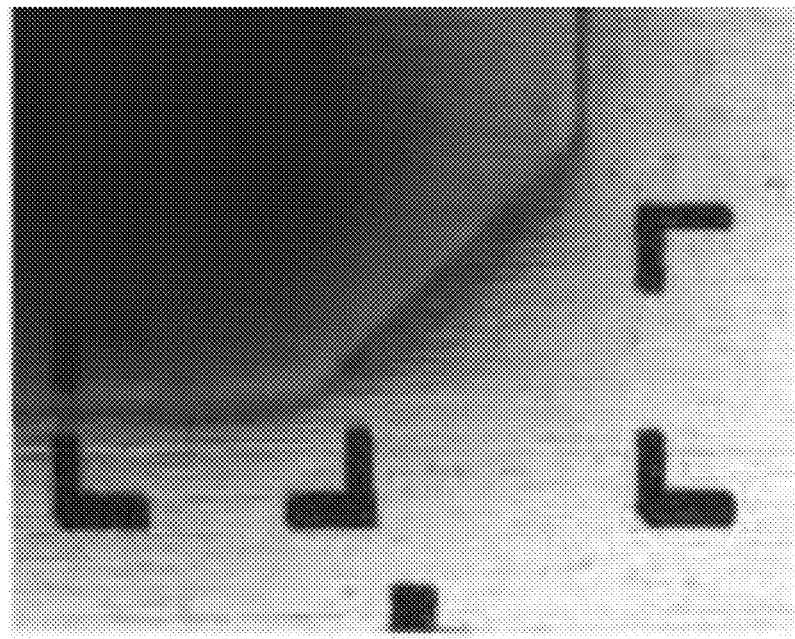
Figure 8D:
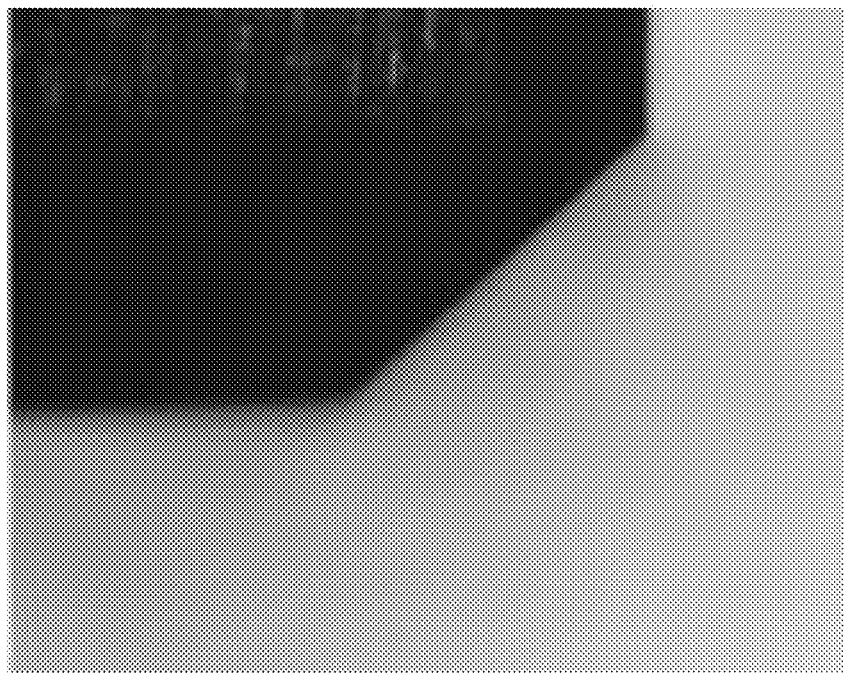
Figure 8E:
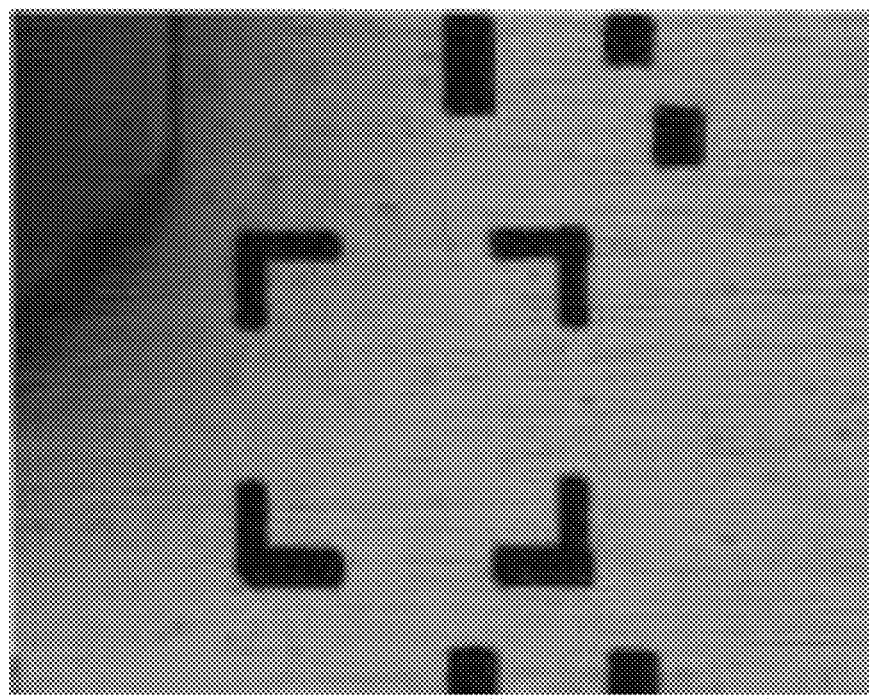

Similarly, according to contents of a window W2 (the actual photographed result of the first composite image IM21 is shown in FIG. 8C, and the actual photographed result of the second composite image IM22 is shown in FIG. 8D), the measurement pixel coordinates (969,601) of the measurement point MP2 can be obtained, and the reference pixel coordinates (1038, 342) of the reference point P4 of the fourth type of "L" symbol can be obtained. In this case, however, the encoding pattern is shielded by the object, and the decoding can not successfully performed. Therefore, the platform 3 is moved leftward by 720 μm, to obtain a third composite image IM23 corresponding to a new window W3 (the actual photographed result is shown in FIG. 8E). Thus, the image scale coordinates (19, 10.5) and the reference pixel coordinates (830, 344) of the reference point P3 of the third type of "L" symbol can be obtained, wherein the encoding patterns above the positioning mark 12C in FIG. 7 represent the numbers 19 and 11, respectively.

Thus, when the encoding pattern set 16 presented in the first composite image IM21 corresponding to the measurement point MP2 is shielded by the object 2, the processor 30 controls the driving mechanism 40 to move the image scale 10 or the image capturing device 20, and controls the image capturing device 20 to mainly focus on the top surface 10T of the image scale 10 to capture the image scale 10 to obtain the third composite image IM23 (at this time, the object is in a defocused state), wherein the processor 30 determines the image scale coordinates and the reference pixel coordinates of the reference point P4 of the positioning mark 12D according to the positioning mark set 11 and the encoding pattern set 16 in the first composite image IM21 and the third composite image IM23, and performs the above-mentioned step (iii).

Since the photographing of the image coordinates has the comparative meaning only in the situation that a position of an X-Y platform or table 3 is kept unchanged. If two images are photographed when the X-Y platform is positioned at different positions, the pixel coordinates in the images thereof can not be directly compared, and the positioning precision of the X-Y platform having the error equal to about 10 to 20 μm must be considered. Thus, the calculation cannot be performed according to the positioning position of the X-Y platform.

The X coordinate of the image scale coordinates of the reference point P4 of the fourth type of "L" symbol in the image of the window W2 is equal to that of the reference point P3 of the third type of "L" symbol in the image of the window W3 plus (−0.5), and the Y coordinates of the reference points P3 and P4 are the same. So, the reference pixel coordinates (1038, 342) and the image scale coordinates (18.5, 10.5) of the reference point P4 of the fourth type of "L" symbol in the window W2 can be obtained according to the image information of the window W3. Thus, the world coordinates of the measurement point MP2 are (1000*18.5+(969−1038)*1.05, 1000*10.5−(601−342)*1.05)=(18427, 10228).

After the world coordinates of the measurement points MP1 and MP2 are obtained, the coordinate differences between the measurement points MP1 and MP2 can be determined as (4019, 15), that is, the length of the connection line connecting the measurement points MP1 and MP2 to each other is 4019 μm, and the included angle between the connection line of the measurement points MP1 and MP2 and the X-axis is about 0.2 degrees.

In addition, the processor may also judge whether there is a skew according to multiple reference points of multiple positioning marks in the composite image. If the skew is present, the de-skewing operation may be performed.

According to the above-mentioned embodiment of the present invention, in order to solve the problem that the dimension of the measured object must be restricted to be smaller than the size of the field of vision of the camera when the pure image measurement of the object is performed. The invention provides the concept of the image scale, wherein the to-be-measured object is placed on a carrier having positioning marks and encoding patterns, and the object, the patterns and the marks are photographed by the camera at the same time. The actual position of the partial appearance of the object in the image is recognized by analyzing the patterns and marks Consequently, as long as the captured object is placed on the image scale, the length of the object can be measured without being limited by the size of the field of vision of the camera, and without relying on the positioning precision of the platform.

After the experimental test, taking the 4-mm block gauge (object) measurement as an example, the average measurement length is 4011 μm, and the average measurement error is 11 μm. In addition to the length measurement of the object, the image scale can also be used alone as the positioning basis for the movement of the object. For example, by obtaining the coordinates of the pixel in the image of the "L" symbol, and the image scale coordinates of the "L" symbol, the distance of the relative movement between the image scale and the camera can be determined, so that the positioning function of the optical scale or ruler or the magnetic or ruler can be obtained.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A positioning and measuring system, comprising:
an image scale having positioning mark sets and encoding pattern sets arranged in a two-dimensional array, wherein an object is placed on the image scale to shield a portion of the image scale, each of the positioning mark sets comprises positioning marks, each of the encoding pattern sets comprises encoding patterns, and the encoding patterns are disposed in gaps between the positioning marks, respectively;
an image capturing device capturing measurement points of the object and the image scale to obtain composite images;
a processor, which processes the composite images, and determines one or multiple position relationships between the measurement points of the object according to the encoding patterns and the positioning marks to position the object or to measure a dimension of the object; and
a driving mechanism, which is electrically connected to the processor and mechanically connected to the image capturing device or the image scale, and drives one of the image capturing device and the image scale to move relatively to the other of the image capturing device and the image scale, wherein the image capturing device captures the image scale and each of the measurement points by mainly focusing on a top surface of the image scale and a top surface of the object, respectively.

2. The positioning and measuring system according to claim 1, wherein each of the positioning marks comprises two line segments intersecting at a reference point, each of the positioning mark sets comprises four positioning marks, and each of the encoding pattern sets comprises two encoding patterns.

3. The positioning and measuring system according to claim 2, wherein the four positioning marks of each of the positioning mark sets have the same shape but different orientations.

4. The positioning and measuring system according to claim 2, wherein each of the positioning marks of each of the positioning mark sets has an L shape or a V shape.

5. The positioning and measuring system according to claim 2, wherein the four positioning marks of each of the positioning mark sets have different shapes.

6. The positioning and measuring system according to claim 1, wherein in a top view of the positioning and measuring system, the object is smaller than and entirely falls within the image scale.

7. The positioning and measuring system according to claim 1, wherein one of the encoding patterns of the image scale is shielded by the object.

8. A positioning and measuring system, comprising:
an image scale supporting an object and having positioning mark sets and encoding pattern sets arranged in a two-dimensional array, wherein each of the positioning mark sets comprises positioning marks, each of the encoding pattern sets comprises encoding patterns, and the encoding patterns are disposed in gaps between the positioning marks, respectively;
an image capturing device capturing measurement points of the object and the image scale to obtain composite images;
a processor, which processes the composite images, and determines one or multiple position relationships between the measurement points according to the encoding patterns and the positioning marks; and
a driving mechanism, which is electrically connected to the processor and mechanically connected to the image capturing device or the image scale, and drives one of the image capturing device and the image scale to move relatively to the other of the image capturing device and the image scale, wherein the image capturing device captures the image scale and each of the measurement points to obtain the two composite images, and the two composite images comprise a first composite image and a second composite image, which are captured by the image capturing device mainly focusing on a top surface of the image scale and a top surface of the object, respectively.

9. The positioning and measuring system according to claim 8, wherein the processor performs steps of:
(i) obtaining measurement pixel coordinates of the measurement point according to the second composite image;
(ii) obtaining image scale coordinates and reference pixel coordinates of a reference point of the positioning mark according to the positioning mark set and the encoding pattern set in the first composite image; and
(iii) determining world coordinates of the measurement point according to the image scale coordinates, the measurement pixel coordinates, the reference pixel coordinates, a unit length of the positioning mark set, a pattern of the positioning mark and an object resolution of the image capturing device.

10. The positioning and measuring system according to claim 9, wherein if the image scale coordinates are (a, b), the measurement pixel coordinates are (c, d), the reference pixel coordinates are (e, f), the unit length is equal to g units, and the object resolution is h unit/pixel, then in the step (iii):
when the pattern of the positioning mark is a first pattern, the world coordinates of the measurement point are $(2g*a+(c-e)*h, 2g*b-(d-f)*h)$;
when the pattern of the positioning mark is a second pattern, the world coordinates of the measurement point are $(2g*a+(c-e)*h+g, 2g*b-(d-f)*h)$;
when the pattern of the positioning mark is a third pattern, the world coordinates of the measurement point are $(2g*a+(c-e)*h, 2g*b-(d-f)*h-g)$; and
when the pattern of the positioning mark is a fourth pattern, the world coordinates of the measurement point are $(2g*a+(c-e)*h+g, 2g*b-(d-f)*h-g)$.

11. The positioning and measuring system according to claim 9, wherein when the first composite image corresponding to one of the measurement points shows that the encoding pattern set is shielded by the object, the processor controls the driving mechanism to move the image scale or the image capturing device, and controls the image capturing device to mainly focus on the top surface of the image scale to capture the image scale to obtain a third composite image, wherein the processor obtains the image scale coordinates and the reference pixel coordinates of the reference point of the positioning mark according to the positioning mark set and the encoding pattern set in the first composite image and the third composite image, and performs the step (c).

12. The positioning and measuring system according to claim 9, wherein an X-axis direction of an image scale coordinate system for specifying the image scale coordinates is the same as X-axis directions of a measurement pixel coordinate system for specifying the measurement pixel coordinates, a reference pixel coordinate system for specifying the reference pixel coordinates, and a world coordinate system for specifying the world coordinates, and a Y-axis direction of the image scale coordinate system is the same as a Y-axis direction of the world coordinate system but opposite to Y-axis directions of the measurement pixel coordinate system and the reference pixel coordinate system.

* * * * *